March 27, 1934.   O. I. JUDELSHON   1,952,209
CLOTH CUTTING MACHINE
Filed Jan. 6, 1932   4 Sheets-Sheet 1
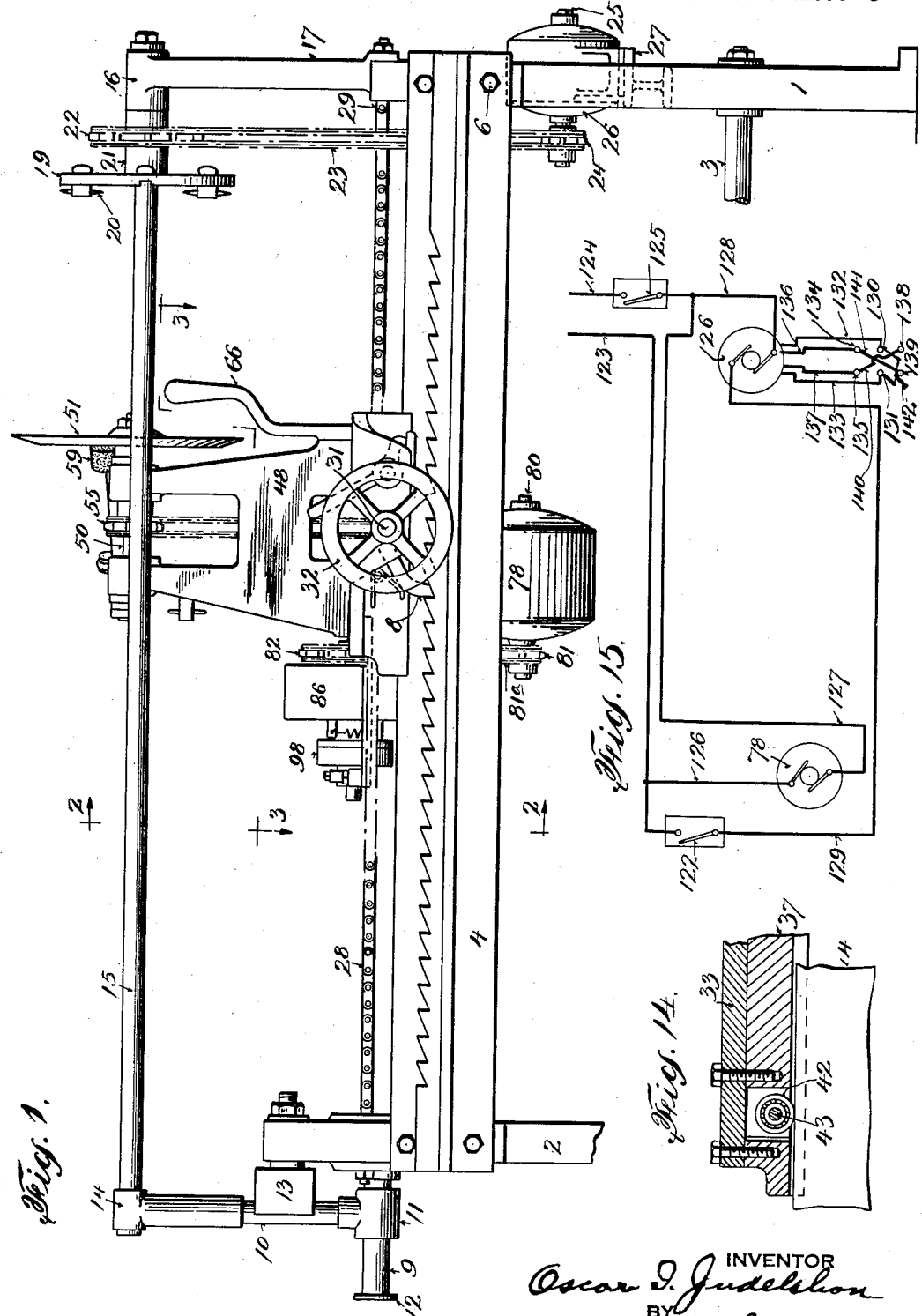
INVENTOR
Oscar I. Judelshon
BY
Charles G. Hensley
ATTORNEY

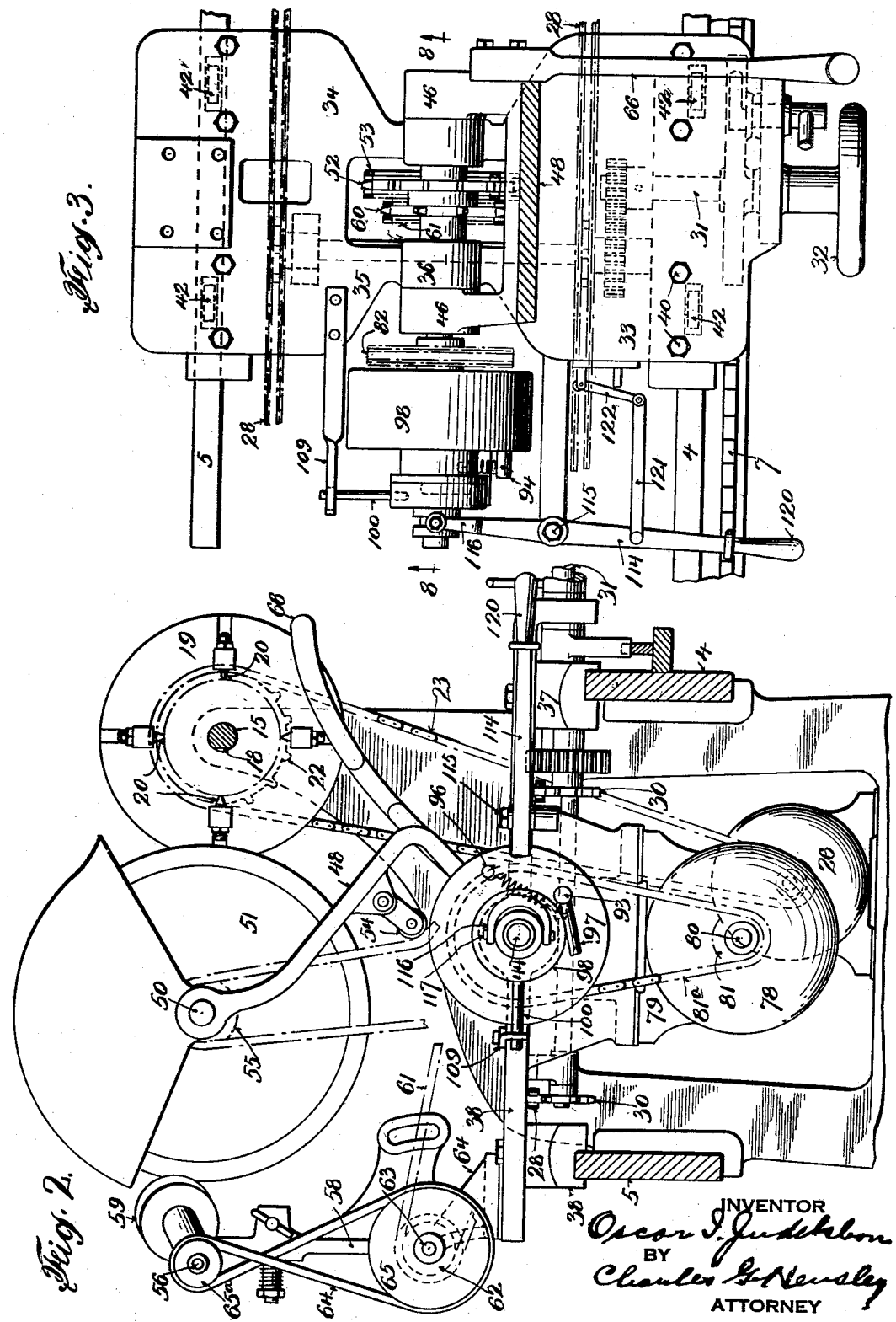

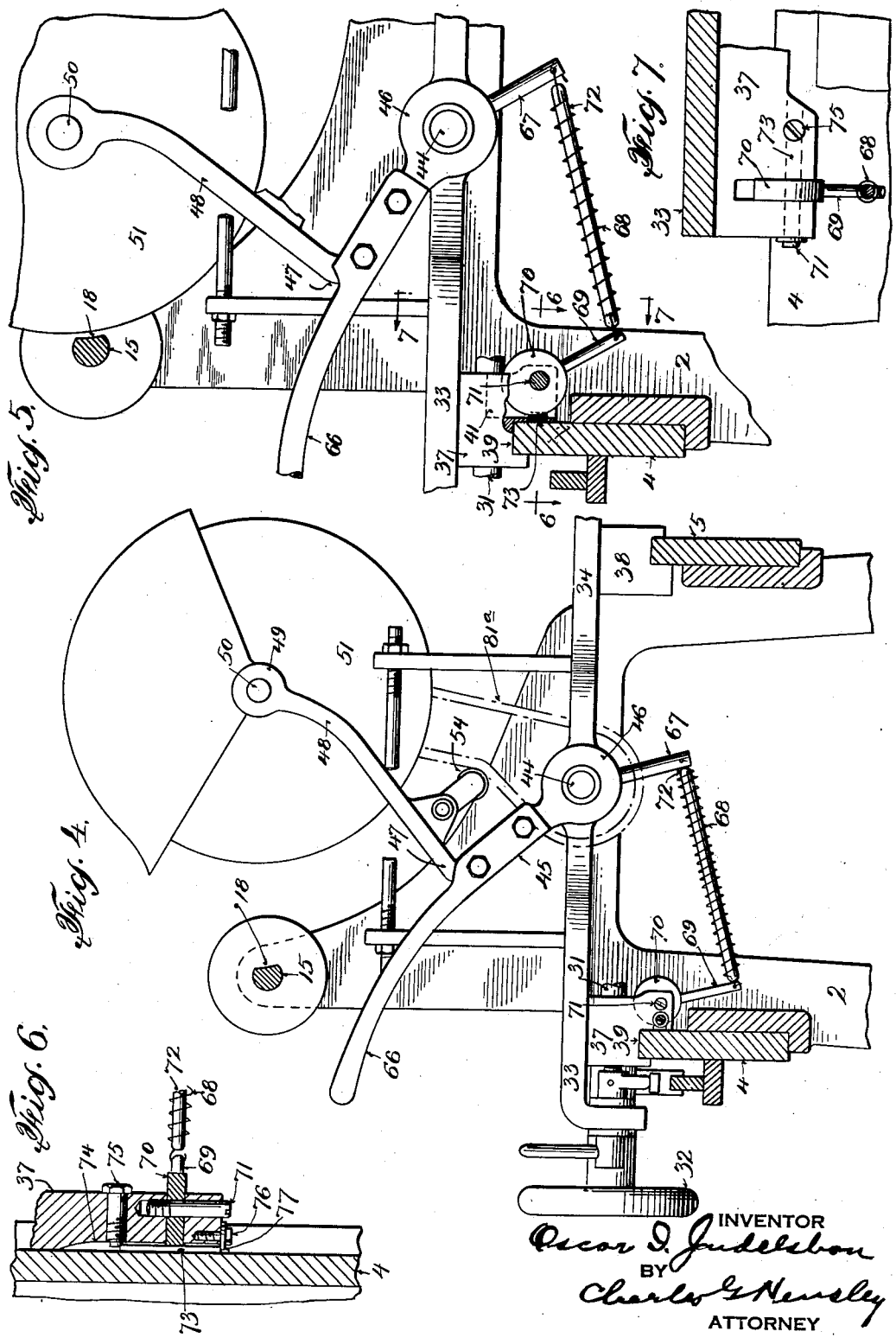

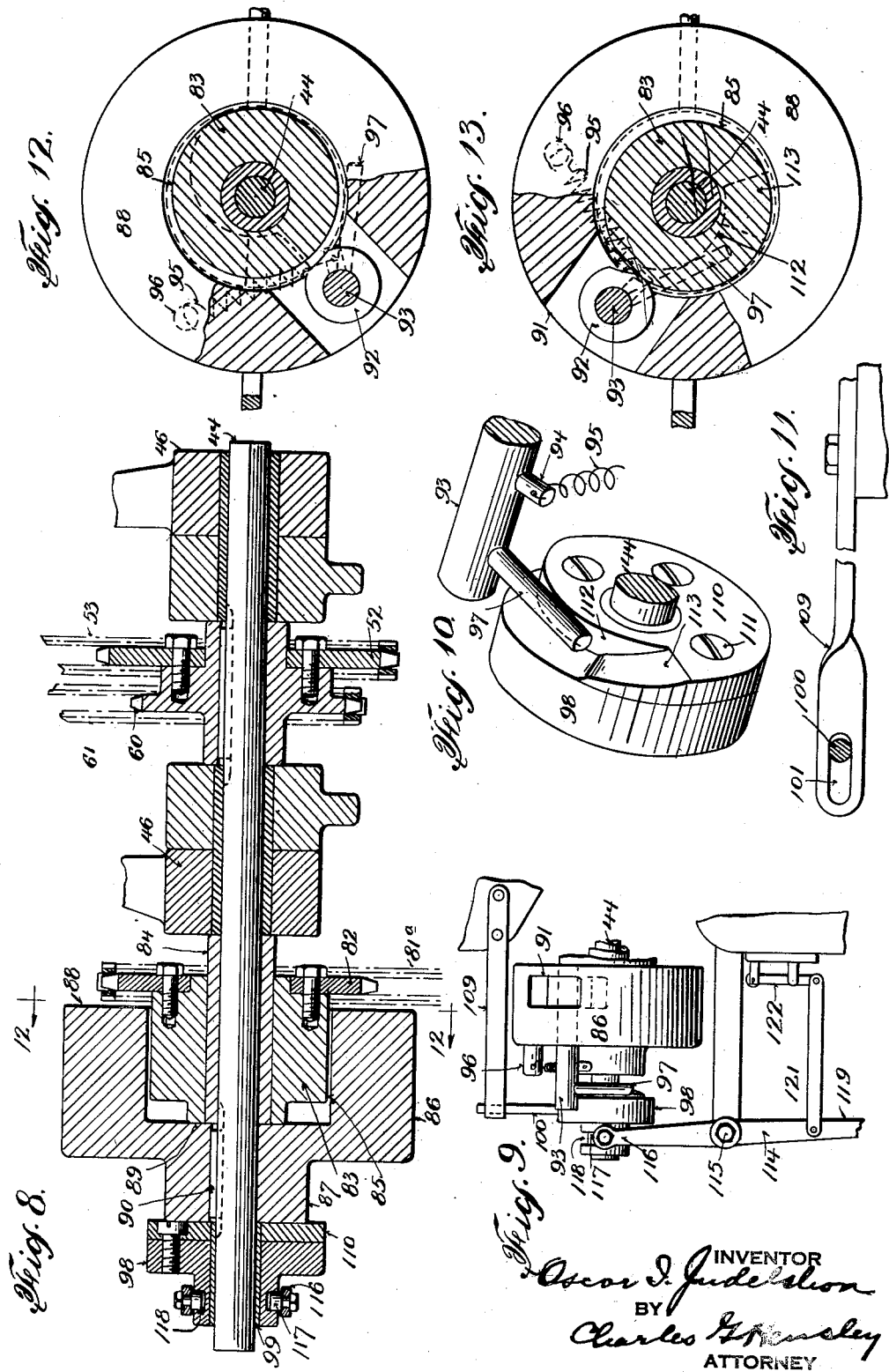

Patented Mar. 27, 1934

1,952,209

UNITED STATES PATENT OFFICE 1,952,209

CLOTH CUTTING MACHINE

Oscar I. Judelshon, Park Ridge, N. J.

Application January 6, 1932, Serial No. 585,007

12 Claims. (Cl. 164—69)

The present invention relates to machines for cutting rolls of cloth into discs of various widths suitable for use as binding material, although any type of fabric may be cut on the machine to be used for any other purpose. In my copending application Serial No. 506,895 I have shown and described a machine of this character but the machine forming the subject of the present application has certain advantages over my said application. Some of the parts shown in that application may be incorporated in the present machine.

In fabric cutting machines of the type referred to, it is customary to provide a shaft to receive the roll of cloth or other fabric thereover to support the fabric in a horizontal position. In some types of machines the fabric shaft has been revolvable and the chuck for gripping one end of the roll of fabric has been revolvable with the shaft; but the Judelshon type of machine which has been marketed by me for a number of years has a stationary fabric shaft with a groove extending the major portion of its length to allow the cutting knife to extend into the groove and insure a complete cut through the roll of fabric and through the cardboard tube on which the fabric is wound.

In this type of machine the chuck is revolvably mounted on the fabric shaft so that it revolves and carries the roll of fabric with it while the fabric shaft remains stationary and the fabric revolves around it.

In this latter type of machine the cutting knife, together with the apparatus for maintaining the same sharpened and also the gauge for determining the position of the cutting knife in relation to the end of the roll of fabric, have all been mounted on a carriage which is movable lengthwise in the machine, the carriage being guided by suitable rails forming part of the machine structure.

The power for operating the movable parts on this carriage has been transmitted to the carriage shaft from a longitudinal drive shaft which was substantially the length of the machine, the drive parts on the carriage being feathered on the large drive shaft so that the latter could drive the parts on the carriage in various positions in which the carriage might be placed. This carriage is made movable lengthwise of the machine in order to advance the position of the knife as the several discs of fabric are cut from the roll.

In this type of machine a substantial portion of the cost of manufacture is consumed in accurately positioning the long drive shaft, in making the shaft true and also making its position correspond accurately with the guide rails of the frame. As the carriage encircled and travelled along the drive shaft and was at the same time guided by the rails, it was necessary that the rails and the shaft correspond very accurately in alignment in order to prevent the carriage from binding and in order that the drive shaft might operate the parts on the carriage without binding.

One of the principal objects of the present invention is to entirely eliminate the long drive shaft from the machine, thereby avoiding the difficulties of securing accurate alignment between the drive shaft and the guide rails. I also eliminate the cost of making and truing the drive shaft.

Furthermore, the necessity of maintaining the drive shaft true after the machine has been in use for a long period is also eliminated. At the same time I retain all the advantages of the carriage adjustable lengthwise of the machine and guided by suitable rails, together with locking mechanism for locking the carriage in different positions during the cutting operations. I also make it possible to utilize the advantages of a cutting machine having a stationary fabric shaft with a revolving chuck.

To accomplish these advantages I mount the source of power, which is preferably an electric motor upon the knife carriage to move with it. This eliminates the necessity of using the long drive shaft. As the motor travels with the knife carriage the driving parts for the knife and the knife sharpener are all movable with the carriage and do not have to be adjusted to agree with the position of the rails which guide the carriage as the driving of the knife is independent of the carriage guides.

Another object of the invention is to provide a clutch interposed between the motor and the knife, by means of which the latter may be connected up for operation by the motor or be disconnected therefrom, and the clutch is also mounted to move with the knife carriage. Heretofore, the motor has been started and stopped whenever the cutting knife was started and stopped. Considerable time was lost because of the time lost by the operator in having to wait for the motor to come to a stop, whereas in the present arrangement the motor may be almost instantaneously disconnected from the knife and the latter may stop quickly and the motor may continue to operate for a few moments due to its momentum.

There are other advantages in having the machine operate so that the motor can run continuously, whereas, the knife may be thrown into and out of operation by means of the clutch without having to start or stop the motor each time the knife is started or stopped. Heretofore, there has been no clutch completely satisfactory for this purpose and I have therefore designed a clutch which is simple and effective for connecting and disconnecting the motor drive with the knife and the knife sharpener. The clutch is positive while in operation, so that there is no slippage as between the motor drive and the knife. The clutch, while especially designed to meet the requirements of the cloth cutting machine to which it is here shown applied, may nevertheless be used with other types of machines where a positive clutch is desired, and I therefore shall claim the clutch not only in combination with the cutting machine, but also independently thereof.

Inasmuch as the motor drive for the knife is mounted upon and travels with the carriage, I prefer to provide an independent motor for revolving the chuck which carries the roll of fabric, especially as the long drive shaft has been eliminated from the machine. In the full combination shown and described herein, this independent motor for revolving the chuck is thrown into and out of operation automatically by the same manual means which throws the clutch interposed between the motor and the knife into and out of operation, in order that the operator will have but one operation to perform in starting and stopping the various parts of the machine. As the motor for driving the chuck is of comparatively low horse power, it may, without serious damage, be started and stopped each time the machine is started and stopped, whereas this is not true of the heavier motor which drives the cutting knife and sharpening wheel.

Another object of my invention is to provide an improved bearing on which the movable knife carriage is mounted to travel on the guide rails. For this purpose I provide rollers having ball bearings, which rollers travel upon the tracks or rails and are housed within and protected by portions of the carriage, and the rails are prevented from accumulating dust and lint by portions of the carriage which sweep such materials from the rails in order to avoid accumulations over which the supporting wheels might have to travel and which, if present, cause inaccuracies in the movement of the carriage in relation to the fabric shaft.

Another object of my invention is to provide an improved locking device for locking the carriage in fixed position while the cutting operation is being carried out. In my copending application I showed a locking device for this purpose which included an eccentric which locked against the guide rail of the frame for the purpose of holding the carriage in any position of adjustment. While that device is operative, I have found that the eccentric is subject to slight wear and that the wear has a tendency to flatten the surface of the eccentric and thereby interfere with its perfect operation.

In the present carriage locking device I employ an eccentric for locking the carriage in relation to the guide rail but I interpose between the eccentric and the rail a friction member or shoe, so that any wear between the parts will take place rather on the shoe than on the face of the eccentric so that the shape of the latter is not altered by any wear. Any wear on this shoe will not affect the accuracy and locking properties of the eccentric even after the device has been in operation for a long period.

I also find that with the shoe interposed between the eccentric and the guide rail the grip or locking action of the device is even more efficient than where the eccentric acts directly upon the guide rail. Other advantages will be set forth in the following detailed description of my invention.

In the drawings forming part of this application,

Figure 1 is a front elevation of the greater portion of the machine embodying my invention, Figure 2 is a sectional view taken on the line 2—2 of Figure 1, Figure 3 is a sectional view taken on the line 3—3 of Figure 1, Figure 4 is a cross sectional view showing the cutting knife and its operating lever together with the device for locking the carriage, Figure 5 is a similar view with parts broken away and showing the carriage locking device in locking position, Figure 6 is a sectional view taken on the line 6—6 of Figure 5, Figure 7 is a sectional view taken on the line 7—7 of Figure 5, Figure 8 is a sectional view taken on the line 8—8 of Figure 3, Figure 9 is a plan view of part of the clutch, the controlling lever and the switch for throwing the chuck motor into and out of operation, Figure 10 is a perspective view of portions of the clutch, Figure 11 is a view showing in elevation the supporting bracket for holding an arm of the clutch device, Figure 12 is a sectional view taken on the line 12—12 of Figure 8, and with parts broken away to show the interior, Figure 13 is a similar view but showing the parts of the clutch in different positions, Figure 14 is a sectional view showing details of the carriage supporting rollers, and Figure 15 is a diagrammatic view of an electric circuit.

In the drawings I have shown a machine frame corresponding substantially with the frame shown in my said co-pending application. The frame includes end standards 1 and 2 disposed at opposite ends of the machine and in parallel relation, the standards being connected by the tie rod 3. In the upper portions of the standards there are mounted beams 4, 5 which are connected between the standards to form a rigid frame, the parts being shown connected by means of bolts 6. The tops of these beams form the rails on which the movable carriage is adapted to travel.

There is a bar 7 mounted at the front of the machine on the frame, and provided with ratchet teeth with which the pawl 8, mounted on the carriage, is adapted to engage to stop the carriage in any one of several positions lengthwise of the machine. This forms an escapement to facilitate the rapid positioning of the carriage frame, and usually the teeth of the rack are of some unit corresponding with the width of the discs which are to be cut from the roll of fabric. The bar is subject to replacement by bars having shorter or longer teeth but this forms no part of my present invention as it conforms with the disclosure in my said co-pending application.

On one end of the machine there is a short shaft 9 rigidly mounted and projecting beyond the machine frame to serve as a support for a bracket arm 10 which has the hub 11 on its lower end surrounding the shaft 9 and limited in its longitudinal movement by the flange 12 on the end of the shaft, so that the arm 10 will not run off the shaft.

This arm 10 extends upwardly and engages in a curved pocket in the adjusting block 13 and at the upper end of the arm there is a horizontal hub 14 which forms a bearing for one end of the fabric shaft 15. The arm 10 is adapted to be shifted on the shaft 9 for the purpose of placing the bearing 14 over the end of the fabric shaft.

It will be understood that the roll of fabric (not shown) is adapted to be placed onto and removed from the fabric shaft at the left hand end of Figure 1, and for this reason the arm 10 is adapted to be detached from the end of the fabric shaft and to be swung laterally away from it to allow the roll of fabric to be placed onto and removed from the fabric shaft. Preferably, the fabric shaft is non-revolving and I have shown a shaft of this type. The opposite end of the shaft is stationarily mounted in the hub 16 on the upper portion of the fixed bracket 17 which is shown as mounted on the right hand end of the machine frame in Figure 1. The two hubs 14, 16 are in alignment when the shaft is in position and the machine is operated.

This fabric shaft 15 is provided with a longitudinally extending groove or cut-out 18 on that side which faces the cutting knife, in order that the edge of the knife may extend within the peripheral line of the shaft in order to insure a clean cut through the roll of fabric and through the paper tube on which it is wound. This is in accordance with my previous machine. The chuck for engaging one end of the roll of fabric and causing it to revolve is shown at 19 and is provided with the piercing pins 20 for piercing the roll of fabric at different points radially of the chuck.

It will be understood that all of the features associated with the chuck and illustrated in my said co-pending application may all be embodied in the chuck of the present machine, but I have not shown them in detail as they are not directly related to the present improvements. The chuck 19 is shown provided with a hub 21 which encircles the fabric shaft and abuts against one end of the hub 16 of the fixed bracket. On the hub of the chuck there is mounted a sprocket wheel 22 over which travels an endless chain 23 and this chain also engages around a sprocket wheel 24 mounted upon the shaft 25 of a small motor 26. This motor is mounted on a suitable bracket 27 on the machine frame and it serves to operate through the sprockets and chain just described to revolve the chuck, and therefore, revolve the roll of fabric which is gripped by the chuck.

It is preferable that this motor be independent of the motor which drives the knife except that the initiation of its operation may be controlled by the manual means which controls the clutch. This motor, therefore, merely performs the operation of revolving the chuck and the fabric upon the stationary fabric shaft. As I shall hereinafter explain, this motor is adapted to be driven in either direction; in other words, it is reversible so that the fabric may be driven in either direction without having to resort to direct and cross belts between the motor and the chuck. The chain drive between this motor and the chuck is the most desirable type and the reversibility of the motor permits the chain drive to be used and to obtain operation of the fabric in either direction. There is a chain 28 extending longitudinally of the machine and having its opposite ends fixed to brackets 29 of the frame.

This chain does not itself partake of any movement but it co-operates with a sprocket 30 on the carriage to effect the shifting of the carriage lengthwise of the machine, as will be hereinafter described. The sprocket 30 which is mounted on the cross shaft 31 of the carriage engages in this chain to cause the carriage to be shifted along the tracks in either direction when the shaft 31 is revolved through the manual operation of the hand wheel 32 at the front of the machine.

The carriage includes plates 33 and 34 disposed at the front and back of the machine respectively, and connected to each other by a narrower section 35 near the middle of the machine, in which are formed adjacent, parallel bearings 36 for the mounting of the carriage shaft. The blocks 37, 38 are connected to the under sides of the plates 33, 34 respectively, and they have grooves or channels 39 in their under sides to receive partially therein the carriage tracks or rails 4, 5. The blocks 37, 38 are shown attached to the carriage plates by the bolts 40. The blocks straddle the rails 4, 5 to control the movement of the carriage.

Within each block there are pockets 41 all of which are alike, and the bottoms of these pockets open into the grooves 39 of the blocks into which the tracks project. In each of the pockets 41 there is mounted a roller 42 on the short shafts 43 by means of ball bearings and the shafts are mounted in the blocks. The several rollers 42, there being two shown at the front and back of the carriage, rest upon the top surfaces of the tracks and support the carriage so that the latter may be very easily moved back and forth in the direction of the length of the machine and parallel with the fabric shaft.

The bottom surfaces of the grooves 39 do not touch the tracks but are held slightly above them by the rollers 42 engaging the tracks to hold the blocks from resting on the tracks. The clearance between blocks 37, 38 and the tracks is so close that if dust, lint or other foreign material falls on the tracks it will be wiped off by the blocks before there is enough accumulation to lift the rollers and affect the movement of the carriage. The rollers and their ball bearings being housed inside the blocks they are also protected from dust.

There is a carriage shaft 44 journaled in the bearings 36 of the carriage frame and from this shaft the knife and sharpening wheel are driven. There is a lever arm 45 having a hub 46 which is pivoted on this shaft to swing in a plane crosswise of the machine. The arm is curved or bent at 47 and its upper end is divided into two arms 48 each of which carries a hub 49 the two hubs aligning with each other. The arbor 50 is journaled in these hubs, preferably in the manner shown more in detail in my co-pending application; and the revolvable knife 51 is mounted on one end of and revolves with the arbor.

This knife is adapted to be revolved at high speed and to cut through a roll of fabric while the latter is being revolved on the fabric shaft with the chuck. The edge of the knife is adapted to pass into the groove 18 of the fabric shaft to insure a cut being made entirely through the fabric and the cardboard tube on which it is wound. This is in accordance with the machine shown in my co-pending case. There is a sprocket wheel 52 mounted on the carriage shaft to revolve with it and the endless chain 53 travels around this sprocket, around an idler tightener 54 and around the sprocket 55 which is mounted on the knife arbor 50.

Through these members the knife is revolved at high speed from power transmitted from the carriage shaft. There is another arbor 56 which is mounted in a hub 57 carried by the upper end of a bracket 58 mounted at the back of the machine frame. The sharpening wheel 59 mounted on the arbor 56 engages the knife when the latter is moved back out of cutting position, for the purpose of resharpening the knife from time to time.

There is another sprocket 60 mounted on the carriage shaft and the chain 61 which travels over this sprocket also travels over the sprocket 62 which is mounted on the shaft 63 on the bracket 64. There is a pulley 65 also mounted on the shaft 63 and over this pulley travels a belt 64 which is crossed and which also travels over the pulley 65 on the sharpening wheel arbor 56. Through the parts just described the operating force is transmitted from the carriage shaft to the sharpening wheel.

The device for locking the carriage at any position along the machine during each cutting operation, and which forms one of the features of my invention is as follows:

The knife arm 45 is adapted to be swung manually by means of the handle 66 to swing the knife toward and from the fabric about the axis of the carriage shaft. There is a small arm 67 fixed to and projecting downwardly from the hub 46 of the knife supporting arm. This arm 67 is connected with one end of a spring 68 the other end of the spring being connected with an arm 69 which is secured to an eccentric disk 70 mounted on the stud shaft 71 which is threaded into the block 37. There is a floating rod 72 disposed inside the coiled spring so that the movement of the arm 67 is positively transmitted to the arm 69 in the direction necessary to set the locking device, the same as in my co-pending application.

Instead of the disk 70 itself coming into direct contact with one of the tracks and thus being subject to wear which might produce flat portions on the disk, I interpose a wear member or shoe. This is shown as a strip of metal 73 set into a socket 74 in the block 37 and lying between the surface of the eccentric disk 70 and one surface of the front track 4 as shown in Figures 4, 5 and 6. There is a screw 75 threaded into a hole in the block 37 and one end engages one end of the shoe 73 to prevent it from shifting in one direction. There is another screw 76 threaded into the end of the block 37 and it carries a washer 77 which engages the other end of the shoe and prevents the latter from shifting in another direction. The shoe, therefore, sets in the socket 75 and is held at opposite ends from lengthwise movement by the screws 75, 76.

When the arm 66 is operated to move the knife 51 toward the fabric to make a cut, the arm 67 acts through the spring 68 and the rod 72 to move the arm 69 and this slightly rotates the eccentric disk. The latter presses on the shoe 73 and presses it against one face of the front rail 4 and causes the carriage to be locked against movement until the cutting operation has been completed. When the arm 66 is swung in the reverse direction after the cutting operation to swing the knife back into inoperative position, the arm 67 acts through the spring 68 to rock the arm 69 and thus turn the eccentric disk in the reverse direction to that first described. This will bring the parts to the position shown in Figure 4 and the carriage will then be unlocked and it may be shifted for making the next cut by operating the wheel 32.

It will be apparent from the above that the eccentric disk 70 does not come into direct contact with the track 4 and therefore it is not subject to wear and cannot develop flats which might render it less effective or inoperative.

The disk 70 comes into contact with the shoe 73 which does not travel in relation to the disk. Any wear occurs on the face of the shoe 73 which engages the track and as that face is flat no irregularity or unevenness develops. If the shoe should wear excessively a new one may readily be substituted for the worn one. The locking device is even more effective with the shoe interposed between the eccentric and the track than if the eccentric disk came into direct contact with the rail.

The source of power for driving the carriage shaft from which the knife and sharpening wheel are driven, is shown as a motor 78 and this motor is mounted upon and travels with the knife carriage. I have shown a frame 79 underslung from the knife carriage and this supports the motor 78, the shaft 80 of which preferably extends parallel with the carriage shaft. There is a sprocket 81 shown mounted on the motor shaft 80 and over this travels a chain 81 which transmits the power from the motor to the sprocket 82 associated with the clutch device.

I have shown this latter sprocket mounted on and fixed to one of the clutch members 83; and the chain 81 travels over this sprocket and conveys the power from the motor to the clutch member 83 whenever the motor is in operation. The clutch member 83 revolves freely when the clutch is not active, on the bushing 84 which is fitted over a portion of the carriage shaft. That is, the member 83 revolves idly when the clutch is disengaged.

The periphery 85 of the clutch member 83 is formed slightly eccentric to the axis of the carriage shaft and this eccentricity is exaggerated in the drawings in order to make it visible. In actual practice the eccentricity need only be a few thousandths of an inch.

The other member of the clutch is shown at 86, and this comprises a hub portion 87 and a laterally extending cylindrical portion 88 which fits over and encloses the member 83 but it does not contact directly with it except possibly where they meet at the line 89. The clutch member 86 is mounted on the carriage shaft 44, preferably without any intervening bushing because this member revolves at all times with this shaft. For this purpose I have shown a key 90 in the hub 87 engaging a keyway in the shaft 44 so that the clutch member 86 will always revolve with the shaft.

The member 86 is formed with an opening or pocket 91 in which is disposed an eccentric clutch member 92. The periphery of this member 92 is formed eccentric to the axis of the shaft 93 on which it is mounted. The shaft 93 partakes only of a rocking motion in relation to the member 86 although it rotates along with the latter.

This rock shaft has its bearings in the member 88 and it is shown as disposed parallel with the carriage shaft but offset or spaced from it. This shaft projects beyond the member 88 toward the left in Figure 9, and it has an arm 94 to which one end of a coiled spring 95 is connected, the other end of the spring being connected to a pin 96 projecting from the member 86. This spring has a tendency to turn the rock shaft 93 in one direction for a purpose to be later described.

There is an arm 97 also fixed to the rock shaft and by means of which the latter may be rocked in opposition to the resistance of the spring 95. There is a member 98 mounted on the carriage shaft 44, preferably surrounding the bushing 99 which latter surrounds the shaft and is caused to revolve with it by the same key 90 which connects the member 87 with the shaft, as shown in Figure 8.

But the member 98 is prevented from revolving with the shaft 44 by means of an arm 100 which is fixed to and projects from the member 98 and which extends through a slot 101 in the bracket 102 attached to part of the carriage. The slot 101 is elongated to allow the pin 100 to travel lengthwise of the bracket 109 a distance corresponding with the shifting of the member 98 as hereinafter described.

The member 98 has formed thereon or, as shown in Figures 8 and 10, attached thereto, a cam member 110 which is secured thereto by the screws 111 so that it is rigid with the member 98. The cam member 110 has a spiral surface 112 extending from a point relatively near the shaft 44 and gradually spiralling outwardly until it coincides with the periphery of the member 98. The member 110 is cut inwardly on its face as shown at 113 to permit the spiral surface 112 to be passed under the arm 97 on the rock shaft.

The member 98 is adapted to be shifted to the right as viewed in Figures 8 and 9 a distance about the width of the spiral surface 112. For this purpose I have shown a lever 114 pivoted at 115 on a bracket secured to or made integral with the carriage. One arm of this lever has a fork 116 straddling the reduced end of the member 98 and the fork has rollers 117 engaging in the peripheral groove 118 of the member 98. The other arm 119 of this lever projects to the front of the machine where it has a handle 120 to be grasped by the operator. This arm 119 also carries a link 121 which is pivoted to it at one end, the other end of the link being pivoted to the knife 122 of a switch.

In Figure 15 I have shown the electric circuit. The wires 123, 124 connect with a suitable source of current.

The switch 125 in one of these lines is adapted to be manually operated to start the motor 78 which will ordinarily be operated throughout the working day. The current for the motor 78 which is to drive the cutting knife and sharpening wheel may be traced through the following circuit: From the wire 123 through the wire 126, to one brush of the motor 78; from the other brush of this motor through the wire 127 to the wire 128 and through part of the latter to the switch 125. When the latter is closed the circuit is completed through the wire 124 to the source of supply.

The wire 123 also connects with one side of the switch 122 which is the one operated by the lever arm 119. The wire 129 leading from the other side of this switch 122 leads to one of the brushes of the motor 26 which drives the chuck. From the other brush of this motor the wire 128 leads to the starting switch 125 to one side of which the feed line 124 is connected. The switch 125 must be closed for the machine to be operated. The motor 26 will only operate when the switch 122 is also closed.

The motor 26 may be reversed in order to drive the chuck and revolve the roll of fabric either in the same direction that the cutting knife is revolved or the opposite direction, according to the character of material to be cut. I have shown diagrammatically a reversing switch of well known type for this purpose. Two of the contacts 130, 131 of this switch are connected with the brushes of the motor 26 by the wires 132, 133. The contacts 134, 135 are connected by the wires 136, 137 with the field of the motor. These contacts are also connected to the contacts 138, 139 by the crossed wires 140, 141. By throwing the switch arm 142 the direction of the current through the field of the motor may be reversed and this will reverse the motor and the direction of the chuck and the roll of fabric. The reversing switch is manually operated when the motor 26 is to be reversed, generally when the machine is at rest.

*Operation*

A roll of fabric will be placed on the fabric shaft 15 and for this operation the arm 10 may be slid off the shaft 15 and swung outwardly to allow the roll of fabric to be placed over the left hand end of the shaft 15 in Figure 5. One end of the roll of fabric will be placed against the chuck 19 and the pins 20 will be forced into the fabric all as described in my said co-pending application. The arm 10 may be swung back after the roll of fabric has been placed on the shaft 15 so that its hub 14 supports one end of the shaft 15 as shown in Figure 1. The machine is now ready for operation.

The operator will close the switch 125 and this will send the current from the feed wires 123, 124 through the motor 78 and the latter will be set into operation. Ordinarily this motor will be allowed to run throughout the day or throughout the time the cutting machine is to be operated, in other words, it is not stopped each time a cut is made in the fabric. This motor, through the sprocket wheel 81, the chain 81a and the sprocket 82 will transmit operating force to the clutch member 83 so that the latter runs whenever the motor 78 is operated.

The fabric having been arranged on the fabric shaft and clamped in the chuck, the operator may proceed to cut a disk from the roll of fabric, as follows: The hand wheel 32 will be revolved counterclockwise in Figure 1 to shift the knife carriage to the left to bring the knife near the left hand end of the shaft 15 where the first cut will ordinarily be made. In positioning the carriage, the pawl 8 will fall into some particular tooth of the bar 7 when the knife is even with the end of the roll of fabric.

If the disks to be cut from the roll of fabric are to equal in thickness the distance between two adjacent teeth on the bar 7, the hand wheel 32 may then be turned until the pawl 8 escapes over one tooth of the bar 7 thereby bringing the knife back of the end of the fabric a distance equal to the distance between two teeth of the bar 7. The operator will now initiate the operation of the cutting knife and sharpening wheel by grasping the handle 120 and moving it toward the right in Figure 3. This will cause one arm of the lever 114 which contains the fork 116 to rest by means of the rollers 108, 117 against the wall of the groove 118 and thus force the member 98 to the left in Figure 3 along the shaft 44. The member 98, it will be recalled, is not revolved with the shaft as it is held from doing so by means of the arm 100 which engages in the slot 101 of the stationary bracket 109 so that the member 98 merely shifts axially along the shaft 44 a distance corresponding substantially with the thickness of a cam member 110.

Before the lever 114 was swung in the above manner the arm 97 was resting against the periphery of the member 98 so that the rocker shaft 93 was held in such a position against the opposition of the spring 95 that the periphery of the eccentric member 92 was disengaged from the periphery 85 of the member 83.

When the member 98 is shifted to the left, as above described, the periphery of this member is moved from under the arm 97 and a sufficient distance to carry the cam member 110 to the left and out of the path of the member 97. There being nothing to support the arm 97 when the above shifting operation is completed, the rocker shaft 93 is swung by the spring 95 so that the high portion of the eccentric member 92 comes into position where it will engage the eccentric surface 85 of the member 83.

When these two surfaces come into contact they lock together. When this occurs, the member 83 becomes locked or clutched with the member 88 which is a part of the clutch member 86. As the member 83 is continuously operated by the motor 78 through the sprocket 81, the chain 81a and the sprocket 82, and as the member 88 is now locked with the member 83, the shaft 44 will be caused to revolve with the member 86 of which the member 88 is a part because of the key 90 engaging in a slot in the shaft 44. The shaft 44 will, therefore, be operated as long as the lever 114 is thrown to the position described above.

Through the sprocket 52, the chain 53 and the sprocket 55, the operating force will be transmitted from the shaft 44 to the arbor 50 and the knife 51 mounted thereon and the latter will be revolved at high speed. Through the sprocket 60 the chain 61 and the sprocket 62 operating force will be transmitted from the carriage shaft 44 to the shaft 63. From this shaft power is transmitted to the pulley 65, the crossed belt 64 and the pulley 65a to the arbor 56 on which the sharpening wheel 59 is mounted. Therefore, as long as the clutch is in the position described above, both the cutting knife and the sharpening wheel 59 will be operated.

When the lever 114 was swung in the manner above described, it operated through the link 121 to close the switch 122 and this caused the current to be supplied to the circuits hereinabove described to the motor 26 setting the latter into operation. This motor, acting through the sprocket 24, the chain 23 and the sprocket 22, drives the chuck 19 and the latter causes the roll of fabric to be revolved on the shaft 15.

The operator may now make a cut through the roll of fabric by swinging the handle 66 downwardly to cause the knife to move toward the fabric shaft 15 rocking about the axis of the carriage shaft 44. At the beginning of this movement of the arm 66 the arm 67 on the hub 46 pulls on the spring 68 and this causes the arm 69 to be swung to the right or from the position shown in Figure 4 to the position shown in Figure 5. This causes the eccentric disk 70 to partially revolve so that the eccentric periphery presses against the shoe 73 and forces the latter against one face of the rail 4 and this locks the carriage so that it cannot shift lengthwise of the machine while the cutting operation is being performed. The locking device continues to hold the carriage until the cutting operation has been completed. The arm 66 is moved down until the arm 45 strikes the stop screw 145, whereupon the knife will have cut entirely through the roll of fabric through the paper tube on which it is wound and the edge of the knife will extend partially into the groove 18 of the fabric shaft. When the cutting operation has been completed, the arm 66 will be swung upwardly to or about the position shown in Figure 2. During this return movement of the arm 66, the arm 67 presses against the rod 72 and the latter presses against the arm 69 to positively rotate the eccentric 70 in the opposite direction to that described above, thereby releasing the pressure from the shoe 73 and unlocking the carriage so that it may be repositioned for a new cutting operation.

When the arm 66 is swung upwardly far enough, the edge of the knife will move back against the face of the sharpening wheel 59 so that the wheel will resharpen the edge of the knife.

The lever 114 may now be swung in the opposite direction to that just described above, or into the position shown in Figure 3. This will open the switch 122, causing the circuit of the motor 126 to be opened so that the latter motor ceases to operate the chuck 19 and the roll of fabric. When the lever 114 is thrown back to the position shown in Figure 3, as above described, it moves the member 98 to the right along the shaft 44, so that the lower portion of the cam surface 112 passes under the arm 97. As the member 98 and with it the member 110 are revolving counterclockwise as viewed in Figure 10, the eccentric cam surface 112 gradually lifts the arm 97 until the top of this cam surface engages under the arm 97, whereupon the member 98 may be moved an additional extent to bring the arm 97 onto the periphery of the mebber 98. There is no appreciable pause in the operation of the lever 114 because the arm 97 is very quickly swung by the cam surface 112. When the lever 98 has been fully shifted, the arm 97 will continue to ride in contact with the periphery of this member.

When the cam surface 112 lifts the arm 97, as just described, it causes the rocker shaft 93 to be rocked against the position of the spring 95 sufficiently to disengage the eccentric surface of the member 92 from the eccentric surface 85 of the member 83. As soon as this occurs, the driving connection between the member 83 and the shaft 44 is broken and the latter shaft, together with all the parts operated by it, including the knife and the sharpening wheel, come to rest, although the motor 78 continues to operate.

The operator will proceed to shift the carriage by operating the hand wheel 32 to bring the knife into the next cutting position in relation to the fabric, after which the operator will proceed to make another cut in the fabric. The machine does not have to be stopped between the several cutting operations.

If it is desired to reverse the motor 26 for the purpose of driving the chuck in the reverse direction, it is only necessary to throw the switch arm 142 to reverse the flow of current in the field of the motor 26. In some cases it is desirable to have the fabric revolve in the opposite direction to the knife where low cutting speed is desired, whereas in others the fabric may be revolved in the same direction as the knife for high speed cutting. Instead of changing the connection between the motor and the chuck, it may be effected by simply throwing the switch arm 142.

I have found that by interposing the shoe 73 between the eccentric 70 and the face of the track 4 that the shoe will take any wear and relieve the eccentric 70 from any wear which might tend to change the shape of its periphery and interfere with the smooth locking action thereof. Any wear will, therefore, come upon the shoe 73 which will simply reduce the thickness of this member and not weaken the locking action of the eccentric 70. If the wear becomes excessive, the member 73 may be removed and a new one put in to replace it.

By placing the source of power on the carriage to move with it, the long drive shaft usually employed in machines of this character may be entirely eliminated, and this reduces considerably the cost of manufacture of the machine, avoids much of the wear, and looseness of parts heretofore taking place between the drive shaft and parts on the carriage, and eliminates the tendency of all binding action between the drive shaft and the carriage. By interposing a clutch between the source of power and the carriage shaft, the knife may be thrown into or out of operation quickly and without having to start and stop the motor 78.

By associating the switch 122 with the lever which operates the clutch, the motor 26 is automatically thrown into operation and out of operation whenever the cutting knife is thrown into and out of operation.

The clutch shown and described herein is positive, is quick in action, and there is no slippage when the clutch is thrown in. I have found that even if the periphery of the member 83 is hardened to resist wear there is a positive and non-slippage gripping action between the member 83 and the eccentric 92 and that this action is increased by the fact that the surface 85 is eccentric to the shaft 44 and by the fact that the periphery of the member 92 is also eccentric to the axis of the shaft 93. While making only the member 92 eccentric, the clutch will operate but the action is far more positive when the surface 85 is also eccentric to the shaft 44. The cam surface 112 gradually and effectively acts on the arm 97 to turn the rocker shaft 93 in one direction while the spring 95 operates the rocker shaft in the opposite direction when the arm 97 is disengaged from both members 98 and 110. This clutch is very effective for throwing the carriage shaft 44 into and out of operation in the present machine and it is susceptible also of use in various other machines where a positive clutch action is required. I will therefore claim the clutch both in combination with the other features in the machine as well as independently thereof.

By mounting the wheels 42 which support the carriage in the pockets within the members 37, 38 they and their bearings are protected against dust and lint. Such lint as may collect on the tops of the rails 4, 5 will be wiped off by the blocks 37, 38 so that there will be no material accumulation on the tops of these rails to affect the travel of the carriage.

In instances where a new knife is placed in the machine, it is necessary to grind the edge a considerable time to sharpen it. If at such times there is a roll of fabric on the fabric shaft, the motor 26 can be thrown out of operation by throwing the switch arm 142 of the reversing switch into open position. The motor 26 will not operate while this condition exists, and therefore, the fabric will not be revolved while the knife is being ground. Heretofore, it has been necessary to unship the belt between the main shaft and the chuck, or else remove the goods from the machine. Otherwise, the roll of fabric would be loosened if revolved when the knife is not in operation. The operation of the switch arm 142, therefore, throws the motor 26 out of operation and the roll of fabric remains idle while the knife is being ground down.

Having described my invention, what I claim is:

1. In a fabric cutting machine a shaft adapted to receive a roll of fabric thereon, means for revolving the roll of fabric, means for guiding a carriage parallel with said shaft, a movable carriage guided by said guiding means, a revolvable knife on said carriage adapted to cut the roll of fabric on said fabric shaft, a source of power mounted on and travelling with said carriage, and means for transmitting operating force from said source of power to operate said knife.

2. In a fabric cutting machine a shaft adapted to receive a roll of fabric thereon, means for revolving the roll of fabric, means for guiding a carriage parallel with said shaft, a movable carriage guided by said guiding means, a revolvable knife on said carriage adapted to cut through the roll of fabric on said fabric shaft, a motor mounted on and travelling with said carriage, and means for transmitting operating force from said motor to operate said knife.

3. In a fabric cutting machine a non-revolvable shaft adapted to receive a roll of fabric thereon, said shaft having a longitudinally extending groove, means for revolving the roll of fabric on said shaft, means for guiding a carriage parallel with said shaft, a movable carriage guided by said guiding means, a revolvable knife on said carriage and adapted to cut through the roll of fabric on said fabric shaft, a source of power mounted on and travelling with said carriage, and means for transmitting operating force from said source of power to operate said knife.

4. In a fabric cutting machine a shaft adapted to receive a roll of fabric thereon, means for revolving the roll of fabric, means for guiding a carriage parallel with said shaft, a movable carriage guided by said guiding means, a revolvable knife on said carriage adapted to cut through the roll of fabric on said fabric shaft, a sharpening wheel mounted on said carriage and adapted to sharpen said revolvable knife, a source of power mounted on and travelling with said carriage and means for transmitting operating force from said source of power to said knife and said sharpening wheel.

5. In a fabric cutting machine, a shaft adapted to receive a roll of fabric thereon, means for revolving the roll of fabric, means for guiding a carriage parallel with said shaft, a movable carriage guided by said guiding means, a revolvable knife on said carriage adapted to cut through the roll of fabric on said fabric shaft, a source of power mounted on and travelling with said carriage, means for transmitting operating force from said source of power to operate said knife, and a clutch device mounted on said carriage and adapted to throw said knife into and out of operation by said source of power.

6. In a fabric cutting machine, a non-revolvable shaft adapted to receive a roll of fabric thereon, a chuck for revolving the roll of fabric on said shaft, means for guiding a carriage parallel with said shaft, a movable carriage guided by said guiding means, a revolvable knife on said carriage adapted to cut through the roll of fabric on said fabric shaft, a source of power mounted on and travelling with said carriage, means for transmitting operating force from said source of power to operate said knife, and a clutch device mounted on said carriage and interposed between the source of power and said knife and adapted to be operated to throw said knife into and out of operation while the source of power is in operation.

7. In a fabric cutting machine a shaft adapted to receive a roll of fabric thereon, means for revolving the roll of fabric, a motor for operating said fabric revolving means, means for guiding a carriage parallel with said fabric shaft, a movable carriage guided by said guiding means, a revolvable knife on said carriage adapted to cut through the roll of fabric on said fabric shaft, a motor mounted on and traveling with said carriage, and means for transmitting operating force from said last mentioned motor to operate said knife.

8. In a fabric cutting machine, a shaft adapted to receive a roll of fabric thereon, means for revolving the roll of fabric, a motor for operating said fabric revolving means, means for guiding a carriage parallel with said fabric shaft, a movable carriage guided by said guiding means, a revolvable knife on said carriage adapted to cut through the roll of fabric on said fabric shaft, a motor mounted on and traveling with said carriage, means for transmitting operating force from said last mentioned motor to operate said knife, and a clutch interposed between said second motor and said knife to permit said knife to be thrown into and out of operation.

9. In a fabric cutting machine a shaft adapted to receive a roll of fabric thereon, means for revolving a roll of fabric, means for guiding a carriage parallel with said fabric shaft, a movable carriage guided by said guiding means, a revolvable knife on said carriage adapted to cut the roll of fabric on said fabric shaft, a motor mounted on and travelling with said carriage, a shaft on said carriage, a clutch interposed between said motor and said shaft for throwing the shaft into and out of operation, and means for transmitting operating force from said carriage shaft to said revolvable knife.

10. In a fabric cutting machine a shaft adapted to receive a roll of fabric thereon, means for revolving a roll of fabric on said shaft, a motor for operating said fabric revolving means, a reversing switch for reversing the direction of operation of said motor whereby the fabric may be revolved in either direction, means for guiding a carriage parallel with said fabric shaft, a revolvable knife mounted on and movable with said carriage and adapted to cut a roll of fabric on said shaft, and means for operating said revolvable knife.

11. In a fabric cutting machine a shaft adapted to receive a roll of fabric thereon, means for revolving a roll of fabric on said shaft, a motor for operating said fabric revolving means, means for guiding a carriage parallel with said fabric shaft, a movable carriage guided by said guiding means, a revolvable knife mounted on said carriage and adapted to cut through the roll of fabric on said fabric shaft, a second motor mounted on and travelling with said carriage, means for transmitting operating force from said second mentioned motor to said knife, and a reversible switch for reversing the direction of operation of said first motor to revolve the fabric in either direction.

12. In a fabric cutting machine a shaft adapted to receive a roll of fabric thereon, means for revolving a roll of fabric on said shaft, a motor for operating said fabric revolving means, means for guiding a carriage parallel with said fabric shaft, a movable carriage guided by said guiding means, a revolvable knife mounted on said carriage and adapted to cut through the roll of fabric on said fabric shaft, a second motor mounted on and travelling with said carriage and adapted to operate said knife, a clutch interposed between said second motor and said knife to permit said knife to be thrown into and out of operation, means for operating said clutch and means operated by said clutch operating means for automatically starting and stopping said first motor as said clutch is thrown into and out of operation.

OSCAR I. JUDELSHON.